(12) United States Patent
Granger (10) Patent No.: US 7,298,467 B2
(45) Date of Patent: Nov. 20, 2007

(54) METHOD OF DETERMINING A HORIZONTAL PROFILE LINE DEFINED BY WALLS THAT ARE ESSENTIALLY VERTICAL, AND AN APPARATUS FOR IMPLEMENTING SAID METHOD

(75) Inventor: Romain Granger, Lavardin (FR)

(73) Assignee: Romer, Montoire sur le Loir (FR)

( * ) Notice: Subject to any disclaimer, the term of this patent is extended or adjusted under 35 U.S.C. 154(b) by 75 days.

(21) Appl. No.: 11/256,470

(22) Filed: Oct. 20, 2005

(65) Prior Publication Data
US 2007/0058162 A1    Mar. 15, 2007

(30) Foreign Application Priority Data
Sep. 1, 2005    (FR) ................... 05 08959

(51) Int. Cl.
*G01B 11/26* (2006.01)
(52) U.S. Cl. .................................. 356/141.1
(58) Field of Classification Search ............. 356/141.1
See application file for complete search history.

(56) References Cited

U.S. PATENT DOCUMENTS

| | | | |
|---|---|---|---|
| 4,412,383 A | 11/1983 | Landa | 33/1 |
| 4,506,336 A * | 3/1985 | Hird | 178/18.01 |
| 4,583,292 A | 4/1986 | Langberg | 33/1 |
| 4,918,817 A | 4/1990 | Eaton | 33/1 |
| 6,279,246 B1 | 8/2001 | van den Bossche | 33/556 |
| 6,785,973 B1 | 9/2004 | Janssen | 33/1 |
| 2004/0066508 A1 | 4/2004 | Schmadel | 356/243.1 |
| 2006/0061752 A1 * | 3/2006 | Solomon et al. | 356/4.03 |

FOREIGN PATENT DOCUMENTS

| | | |
|---|---|---|
| DE | 39 11 754 A1 | 10/1990 |
| DE | 43 17 932 A1 | 12/1994 |

OTHER PUBLICATIONS

French Search Report for FR 0508959, dated Mar. 24, 2006.

* cited by examiner

*Primary Examiner*—Thomas H. Tarcza
*Assistant Examiner*—Luke Ratcliffe
(74) *Attorney, Agent, or Firm*—McCormick, Paulding & Huber LLP (57) ABSTRACT

The invention provides a method of determining a horizontal profile line defined by walls that are essentially vertical, by using a pointer having two calibrated reference points, the method comprising the following successive steps:

a) placing the pointer horizontally in contact with a point on the profile line to be determined;

b) from an origin point, measuring in succession the lengths of segments joining the origin point to each reference point, and also the angle between the two segments;

c) deducing by calculation the coordinates of the contact point in the associated horizontal plane, and storing said coordinates; and reiterating steps a), b), c) for a plurality of points on the profile line to be determined, including at least the angle points situated at the intersections between said essentially vertical walls.

The invention also provides apparatus for implementing the above method.

17 Claims, 8 Drawing Sheets

FIG_1

FIG_2

FIG_3

FIG_4

FIG_7

METHOD OF DETERMINING A HORIZONTAL PROFILE LINE DEFINED BY WALLS THAT ARE ESSENTIALLY VERTICAL, AND AN APPARATUS FOR IMPLEMENTING SAID METHOD

CROSS-REFERENCE TO RELATED APPLICATIONS:

Applicant hereby claims foreign priority benefits under U.S.C. § 119 from French Patent Application No. 05 08959 filed on Sep. 1, 2005, the contents of which are incorporated by reference herein.

FIELD OF THE INVENTION

The present invention relates to determining a horizontal profile line that is defined by walls that are essentially vertical.

The invention is directed more particularly to an application of determining a horizontal profile line for measuring the outline of a work surface in a kitchen or a workshop, but without being restricted to such an application.

BACKGROUND OF THE INVENTION

When the room in question presents vertical walls of profile that is irregular, either because of a local projection or setback, or because of the presence of a portion that is curved in convex or concave manner, it is no longer possible to make do with measurements performed in ordinary manner of the three or four rectilinear sides in question for the purpose of subsequently cutting out the work surface that is to be put into place. Thus, when there are irregularities of greater or lesser size in the horizontal profile line in question, use is made of templates of card or plywood with the edge of such a template being progressively shaped by hand so as to fit as closely as possible to the horizontal profile line defined by the vertical walls in question.

In order to avoid the need to make temporary templates, proposals have also been made to use an interferometer for measuring the corners of a room with a laser beam, however accuracy is then of the order of five millimeters which is not very satisfactory, while also being very limiting as to the shape of the irregularities concerned.

Finally, proposals have also been made to use three-dimensional measuring arms of the kind that are conventionally used in building cars or airplanes, but although such arms provide relatively satisfactory accuracy, they are extremely expensive, and not always easy to put into place on the site where the measurements are to be made.

The state of the art is also illustrated by various article positioning devices, such as plotters. U.S. Pat. No. 4,412,383, and U.S. Pat. No. 4,583,292 illustrate cable driven plotters. A more sophisticated device is illustrated in U.S. Pat. No. 4,918,817 which discloses an apparatus using tapes which are pushed or pulled by associated-drive means responsive to signals from control means, said tapes having sufficient stiffness to resist bending under compressive loads applied by the tape drive means in order to be able to pull or push the article over a work surface.

BRIEF SUMMARY OF THE INVENTION

An object of the present invention is to devise a method and apparatus for determining a horizontal profile line making it possible to completely avoid making a temporary template out of card or plywood, while also enabling the profile line in question to be determined very accurately, regardless of the types of irregularity in question.

Another object of the invention is to devise a method and apparatus for determining a horizontal profile line that makes use of technical means that are compact and of reasonable cost, while nevertheless guaranteeing accuracy that is very satisfactory, in particular accuracy of the order of one-tenth of a millimeter.

According to the invention, the above-mentioned problem is solved by a method of determining a horizontal profile line defined by walls that are essentially vertical, by using a pointer having two calibrated reference points, the method comprising the following successive steps:

a) placing the pointer horizontally in contact with a point of the profile line to be determined;

b) from an origin point situated substantially in the same horizontal plane as the contact point and the two calibrated reference points of the pointer, successively measuring the length of the segments joining the origin point to each of the reference points, and also measuring the angle between said two segments;

c) deducing by calculation the coordinates of the contact point in said horizontal plane, and storing said coordinates; and reiterating steps a), b), c) for a plurality of points on the profile line to be determined, including in said plurality of points at least the angle points situated at the intersections between said essentially vertical walls.

Since all the measurements are made in a single horizontal plane, it is possible to provide measurement means that are well adapted to this type of application, and in particular means presenting structure that is much less sophisticated than that of articulated arms for making measurements in three dimensions or other robots conventionally used in the automotive or aviation fields.

Preferably, the length measurements performed in step b) are taken by using a measuring tape pulled from the origin point successively to each of the two reference points of the pointer. In particular, the length measurements are taken by electronic means including a detector fork through which the measuring tape passes, and an encoder which co-operates with said tape.

Also preferably, the angle measurements performed in step b) are taken by using a laser emitter arranged at the origin point and a target engaged on the reference point in question. In particular, the laser emitter is caused to oscillate in a horizontal plane to strike the target several times, with the angle measurement that is retained being the arithmetic mean of the measurements taken during the oscillation of said laser emitter.

Also advantageously, the target also serves as control means for triggering the taking of measurements.

The invention also provides apparatus for implementing a method of determining a horizontal profile line that presents at least one of the above-mentioned characteristics, said apparatus being remarkable in that it comprises:

a stationary stand;

a turret mounted on the stationary stand to turn about a vertical central axis;

a housing secured to the turret and containing a reel of the measuring tape in such a manner that the tape can be pulled from the reel in an essentially horizontal direction so as to bring its free end up to a reference point of a pointer;

first electronic means also mounted on the turret and arranged to measure accurately the length of tape that has been pulled out;

second electronic means arranged to measure the angular displacement of the turret about its axis relative to a reference point of the pointer; and third electronic means arranged to receive the successive measurements of lengths and angular displacement performed by the first and second electronic means, and to calculate the coordinates of a contact point of the pointer, and to store said coordinates in order to determine the corresponding horizontal profile line.

Under such circumstances, advantageously, the first electronic means comprise a detector fork through which the tape passes from the reel, and an encoder having a moving portion over which said tape passed. In particular, the measuring tape presents windows that are uniformly spaced apart, with the passage of the windows being read by the detector fork, the encoder enabling the distance beyond the last window that has passed through said detector fork to be measured, and also serving to measure the travel direction of said tape.

Also advantageously, the second electronic means comprise a laser emitter secured to an encoder mounted on the stationary stand to turn about the same vertical axis as the turret, being arranged in such a manner that the beam emitted by said laser emitter is substantially horizontal, and a target for being aimed at by the beam emitted by the laser emitter, said target also being arranged to serve firstly for hooking onto the free end of the measuring tape, and secondly for being engaged on a reference point of the pointer in such a manner that said free end is close to being vertically above the center of said reference point.

Under such circumstances, and advantageously, the apparatus includes means for causing the laser emitter to oscillate in a horizontal plane, pivoting about the vertical central axis on either side of the direction to a vertical slit carried by the target. In particular, the means for causing the laser emitter to oscillate comprise a motor and gearbox unit secured to the turret, having a vertical outlet shaft carrying a cam co-operating with a bracket whereby the laser emitter is mounted on the encoder.

Also preferably, the target includes a remote control member for triggering oscillation of the laser emitter and measurement of distance by the first electronic means, while the target is being held in the hand of the operator.

It is also advantageous to make provision for the target to be arranged in the form of a generally cylindrical handle, said handle being independently powered, with a receiver diode behind the vertical slit at which the laser beam is aimed, and an infrared emitter pointing towards the means for causing the laser emitter to oscillate, together with a control member arranged in the form of a pushbutton located at the top of the handle and a member for hooking onto the free end of the measuring tape, which member is arranged at the bottom portion of said handle. In particular, the member for hooking the free end of the measuring tape is mounted to turn about an axis that lies vertically over the center of the reference point of the pointer when the handle is engaged via an engagement stud on said reference point.

Also preferably, the turret carries on top a display member serving in particular to display the coordinates of the measured reference points.

Finally, and advantageously, the third electronic means associated with calculation and storage are grouped together in a separate unit connected to the first and second electronic means by a wireless communications system.

Other characteristics and advantages of the invention appear more clearly in the light of the following description and the accompanying drawings, relating to a particular embodiment.

BRIEF DESCRIPTION OF THE DRAWINGS

Reference is made to the figures of the accompanying drawings, in which.

DETAILED DESCRIPTION OF THE INVENTION

Figure 1:
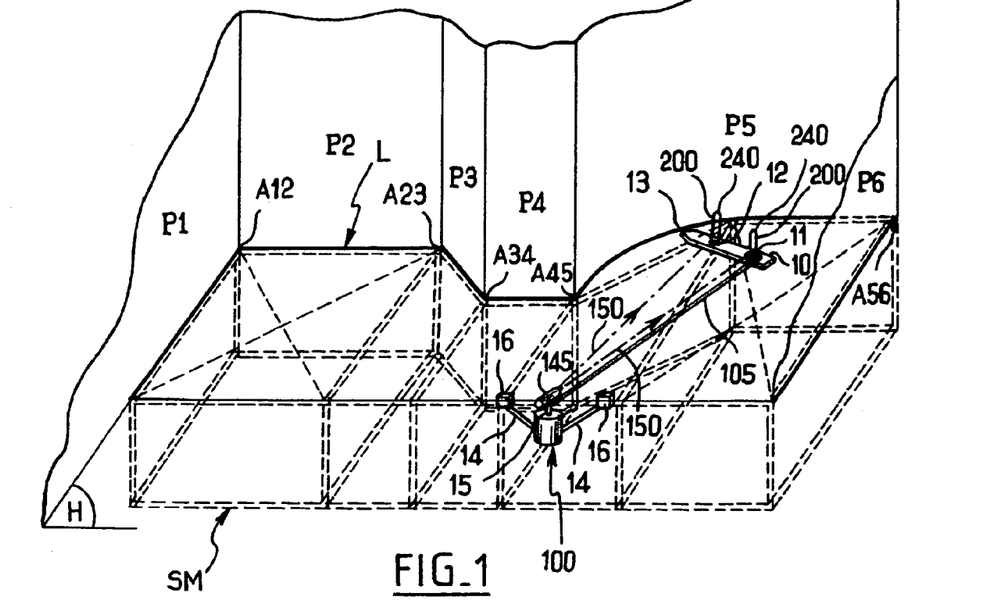
FIG. 1 is a diagrammatic perspective view showing how a horizontal profile line is determined in accordance with the invention, said line in this example presenting a plurality of angle points, and also a portion of profile that is not rectilinear.
Figure 2:
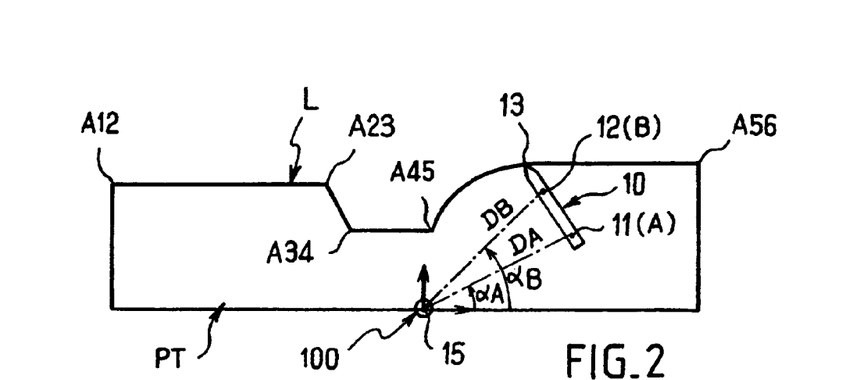
FIG. 2 is a plan view of the example shown in FIG. 1.

FIGS. 1 and 2 are diagrams showing how a horizontal profile line defined by essentially vertical walls is determined in accordance with the invention.

Specifically, there is shown the end of a room which might be a kitchen or a workshop, having walls P1, P2, P3, P4, P5, and P6 that are essentially vertical. These walls are not necessarily rectilinear, as shown for the wall P5 which presents a surface that is concave towards the outside. The walls P3 and P4 form a projection that interferes with determining the horizontal profile line given reference L. It should be understood that the horizontal profile line L is the intersection between a horizontal plane referenced H at the selected height and these various walls P1 to P6 in question, such that the process of determining the profile line takes place exclusively in a two-dimensional space.

FIG. 1 shows the structure of fittings referenced SM defined by a plurality of uprights and cross-members generally made of wood, serving to constitute spaces for receiving machines and/or storage spaces in the form of cupboards or drawers. The top portion of the structure SM is entirely contained in the horizontal plane H, and this structure SM is subsequently to be covered by a work surface PT that presents, beside the walls against which it presses, a horizontal profile line L that corresponds exactly to the shape defined by the walls P1 to P6 in question.

The horizontal profile line L is determined in accordance with the invention by using a pointer having two calibrated reference points. Specifically, there can be seen such a pointer referenced 10 in the form of a rectilinear ruler possessing two blinds 11 and 12 that are set on the central axis of the pointer, and a point 13 whereby the pointer 10 is pressed against a point of the profile line L that is to be determined. The distance between the centers of the blind holes forming the calibrated reference points 11 and 12 is known with great accuracy, as is the distance between said centers and the contact points 13. The pointer 10 then serves as an accurately calibrated calibration element for all of the measurements.

Naturally, it would be possible to use pointers of some other shape, e.g. U-shaped or H-shaped, with such pointers presenting more than two calibrated reference points.

Figure 7:
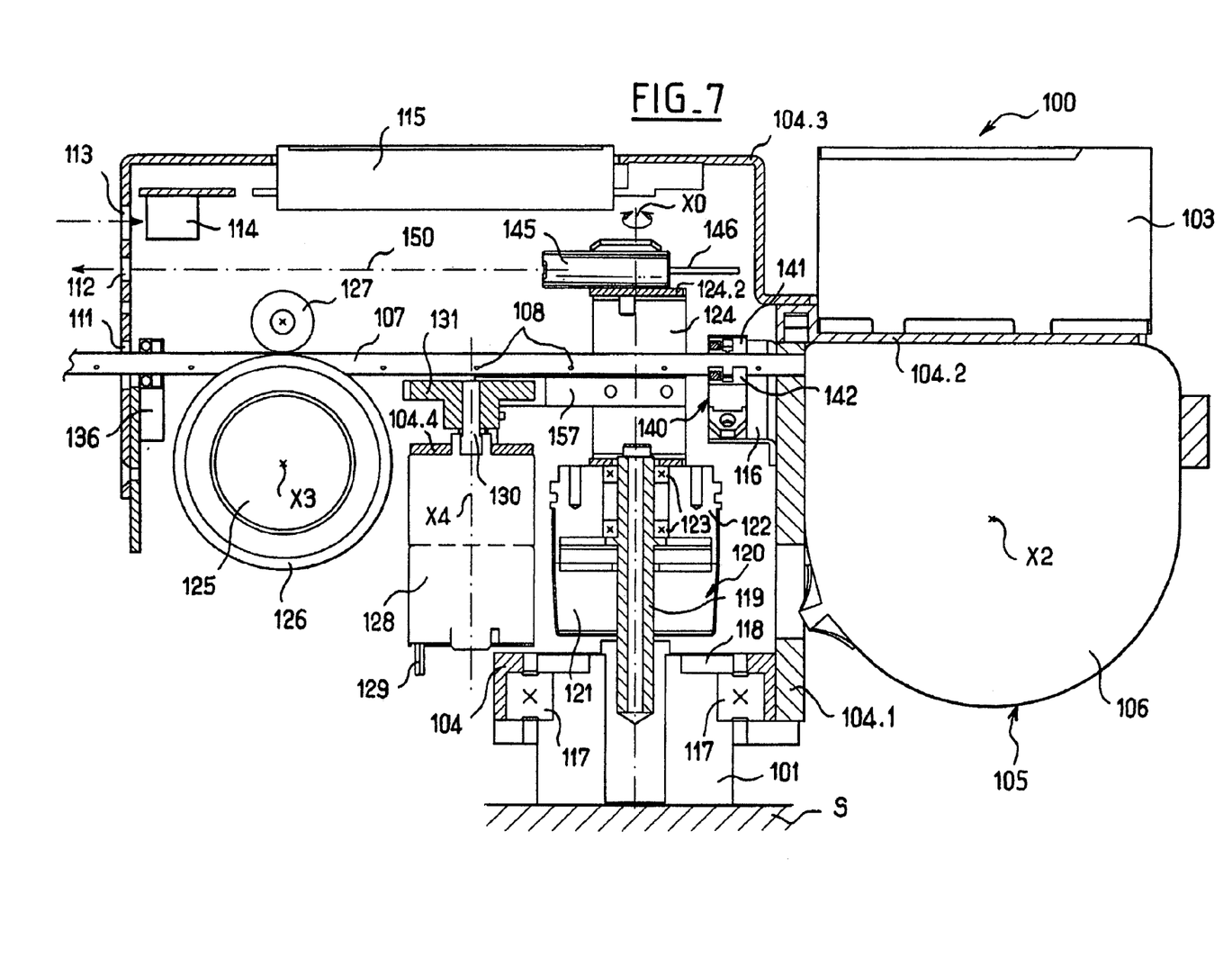
FIG. 7 is a section view on a vertical plane containing the central pivot axis, showing the step of components.

To implement the line-determining process of the invention, use is made firstly of the above-mentioned pointer 10 which is merely placed on the available elements forming part of the structure SM, or on an intermediate plate (not shown) providing stable support. Use is also made of a device that is shown very diagrammatically in FIGS. 1 and 2, given reference 100, which device is secured by arms 14 connected to fastening clamps 16 engaging the structure SM. Naturally, the device 100 could, in a variant, merely be placed on a support S standing on the ground (as in FIG. 7), the important point being that the device is held stationary in stable manner, and at a position corresponding substantially to the level of the horizontal plane H in which the pointer 10 is located.

Basically, the device 100 presents a central axis at a point referenced 15, and amongst other components it includes a reel 105 of measuring tape 107 presenting an end that is pulled up to the reference points of the pointer 10. A member referenced 200 is used for this purpose, the member 200 having the free end of the measuring tape 107 hooked to its base, and being arranged to be suitable for engaging in any of the blind holes in the pointer 10 that define calibrated reference points, and specifically the points 11 and 12.

As can be seen in the plan view of FIG. 2, once the pointer 10 has been placed horizontally so as to be in contact with a point on the line L that is to be determined, measurements are made from an origin point referenced 15 set on the vertical axis of the device 100 and situated substantially in the horizontal plane H containing the contact point 13 and the two calibrated reference points 11 (or A) and 12 (or B) of the pointer 10, of the lengths of the segment from the origin point 15 to each of the reference points 11 and 12.

In FIG. 2, these distances are referenced DA and DB, and they are measured in succession using the measuring tape 107 that constitutes a portion of the device 100.

The device 100 also includes a laser emitter 145 mounted to be capable of turning about the vertical central axis of the device, and point towards the target 200 which is used as a handle for pulling the free end of the measuring tape 107. The target 200 has a vertical slot with a diode placed behind it that emits a signal when it is struck by the laser beam emitted by the laser emitter 145. When the emitted beam referenced 150 strikes the target at the above-mentioned slot, that corresponds to a certain angle value relative to a reference axis, and the same measurement performed when the target is placed on the second calibrated reference points enables another angular position to be determined. In FIG. 2, the angles as measured in this way are referenced aA and aB, thus making it possible immediately to determine the angle formed by the two segments joining the origin point 15 to each of the reference points 11 and 12.

It is then possible to calculate the coordinates of the contact point 13 in the horizontal plane H, and to store those coordinates.

It is then possible to calculate the coordinates of the contact point 15 in the horizontal plane H, and to store those coordinates.

The process of taking successive measurements of segment lengths and of the angle formed between said segments is then reiterated for a plurality of points along the profile line L that is to be determined. Naturally, the operator takes care to ensure that said plurality of points includes at least the angle points situated at the intersections between the essentially vertical walls in question. Specifically, measurements should be made of the following angle points: A12 at the intersection between walls P1 and P2; A23 at the intersection between walls P2 and P3; A34 at the intersection between walls P3 and P4; A45 at the intersection between walls P4 and P5; and A56 at the intersection between walls P5 and P6. In addition to the above-mentioned angle points A12, A23, A34, A45, and A56, care will naturally also be taken to take intermediate measurements wherever the profile appears not to be perfectly rectilinear, and in particular when the profile is curvilinear as shown between the points A45 and A56. By making a plurality of measurements along this curved portion of the line L, it is possible to copy the curve in question accurately, and thus to reconstitute a complete profile.

The length measurements taken during the process of determining the profile are made by using the measuring tape 107 pulled from the origin point 15 successively to each of the reference points 11 and 12 of the pointer 10. Naturally, it would be possible for the length of tape that is pulled to be examined visually, but it is highly preferable to provide an automatic process for taking the measurements, by using electronic means having a detector fork through which the measuring tape 107 passes and an encoder that co-operates with said tape. The electronic means are described in greater detail below.

Similarly, the angle measurements could be made visually by the operator using means analogous to a protractor, but naturally it is preferable to use electronic means for taking these angle measurements automatically, and in particular the laser emitter 145 that is arranged at the origin point 15 and that co-operates with the target 200 engaged on the reference point 11 or 12 in question. As described below, it is advantageous to make provision for the laser emitter 145 to pivot back and forth in a horizontal plane in order to strike the target 200 several times, with the angle measurement that is retained then being the arithmetic mean of the measurements performed on each oscillation of said laser emitter. Good accuracy is thus achieved by taking a plurality of complementary measurements.

As shown diagrammatically, there is preferably also a button at the top of the handle-forming target 200, which button, referenced 240, constitutes control means enabling the taking of measurements to be triggered, without it being necessary to act directly on the device 100 carrying the laser emitter 145.

There follows a description in greater detail with reference to FIGS. 3 to 8 of the structure of the determination device 100 that is described very succinctly above.

The device 100 stands on a machine support S which is either secured to the structure SM or else placed on a local support as mentioned above. The device 100 has a stationary stand 101 surmounted by a turret 104 that is mounted on said stationary stand to turn about a vertical central axis referenced X0.

Figure 3:
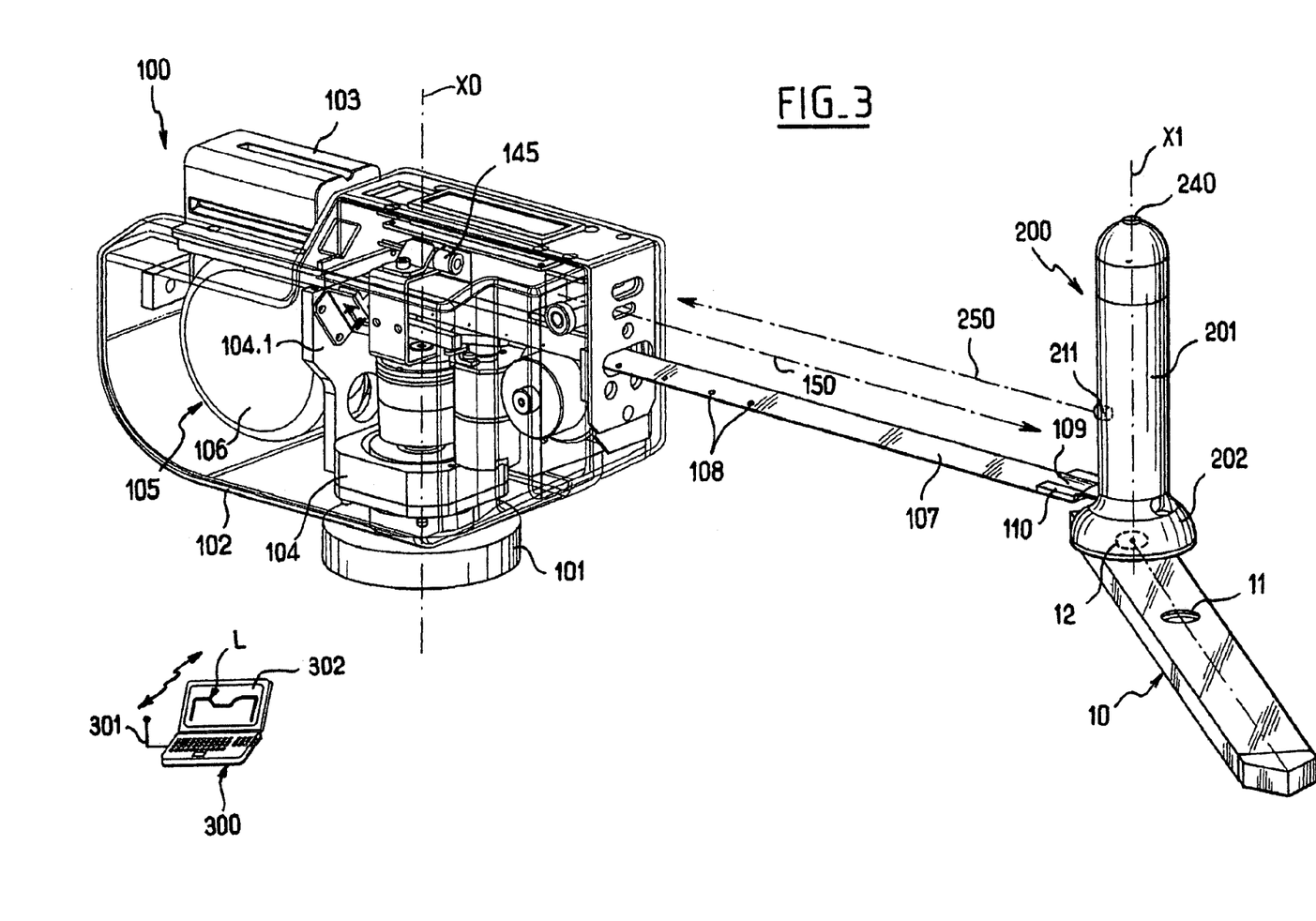
FIG. 3 is a perspective view showing apparatus for implementing the invention, with a pointer on which there is engaged a handle for pulling the end of a measuring tape, which handle is also used for measuring and controlling the determination process.
Figure 4:
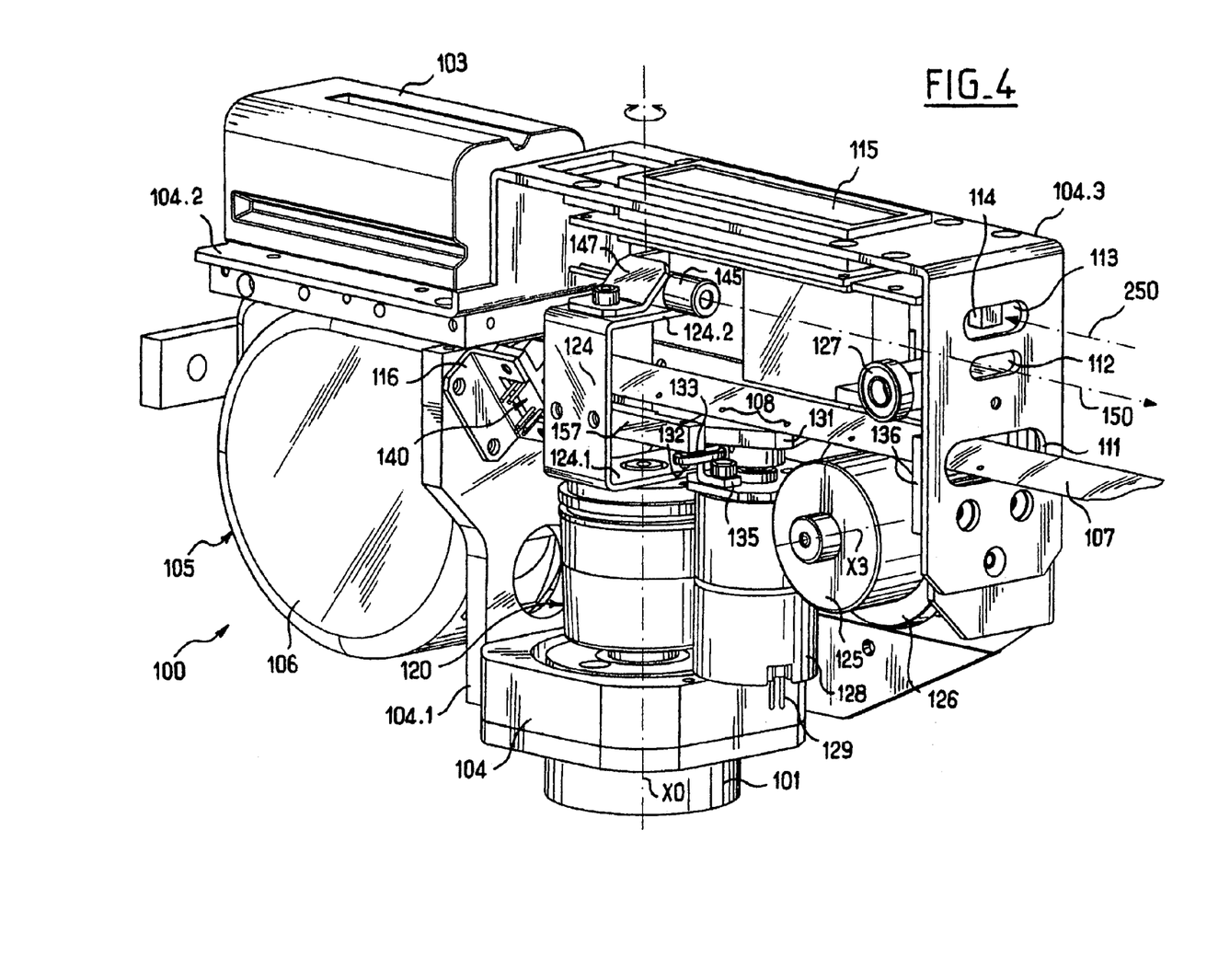
FIG. 4 is a view on a larger scale of the above-mentioned apparatus, with an external cover removed therefrom to show its components more clearly.
Figure 5:
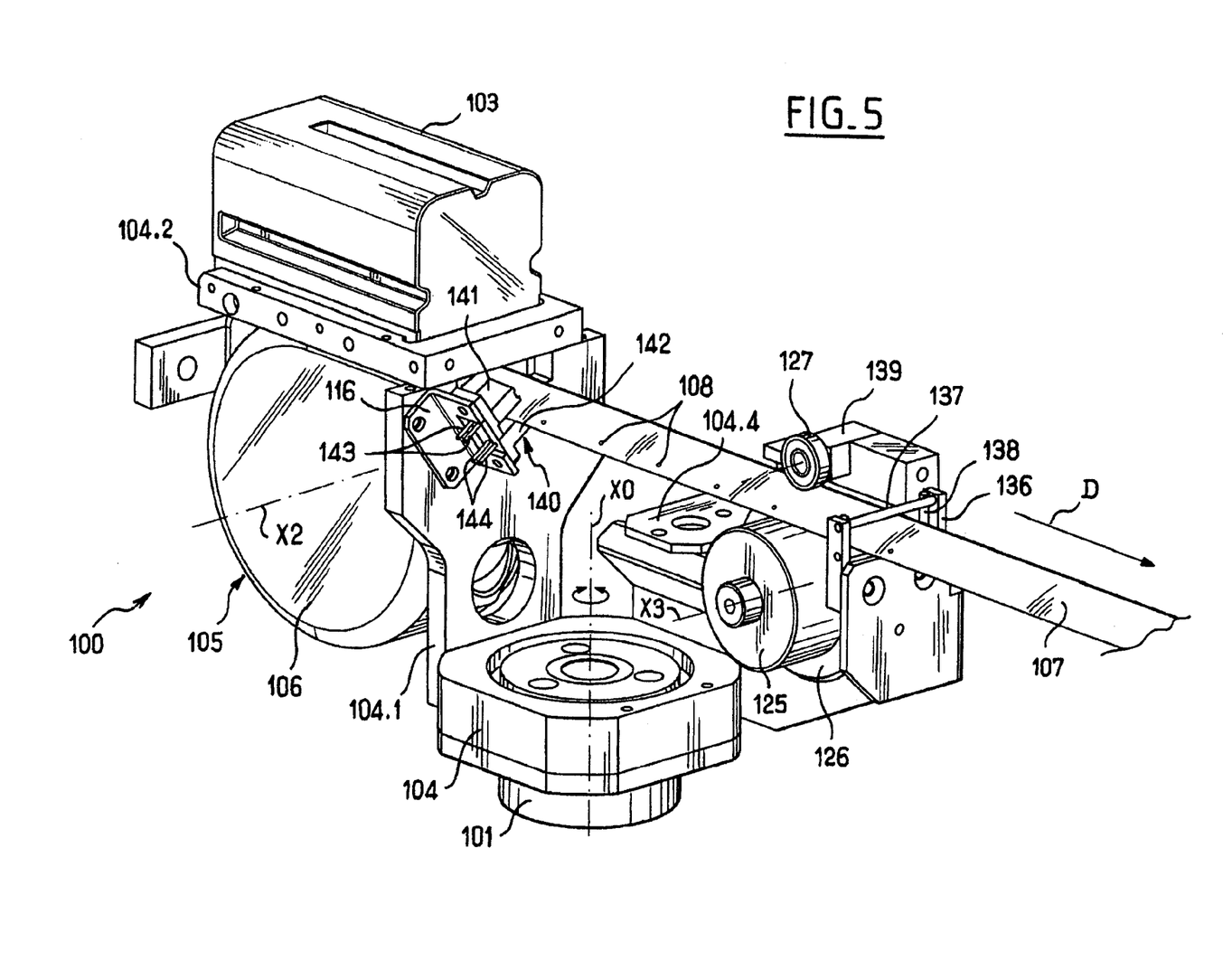
FIG. 5 is an analogous view restricted to the members associated with the action of the measuring tape.
Figure 6:
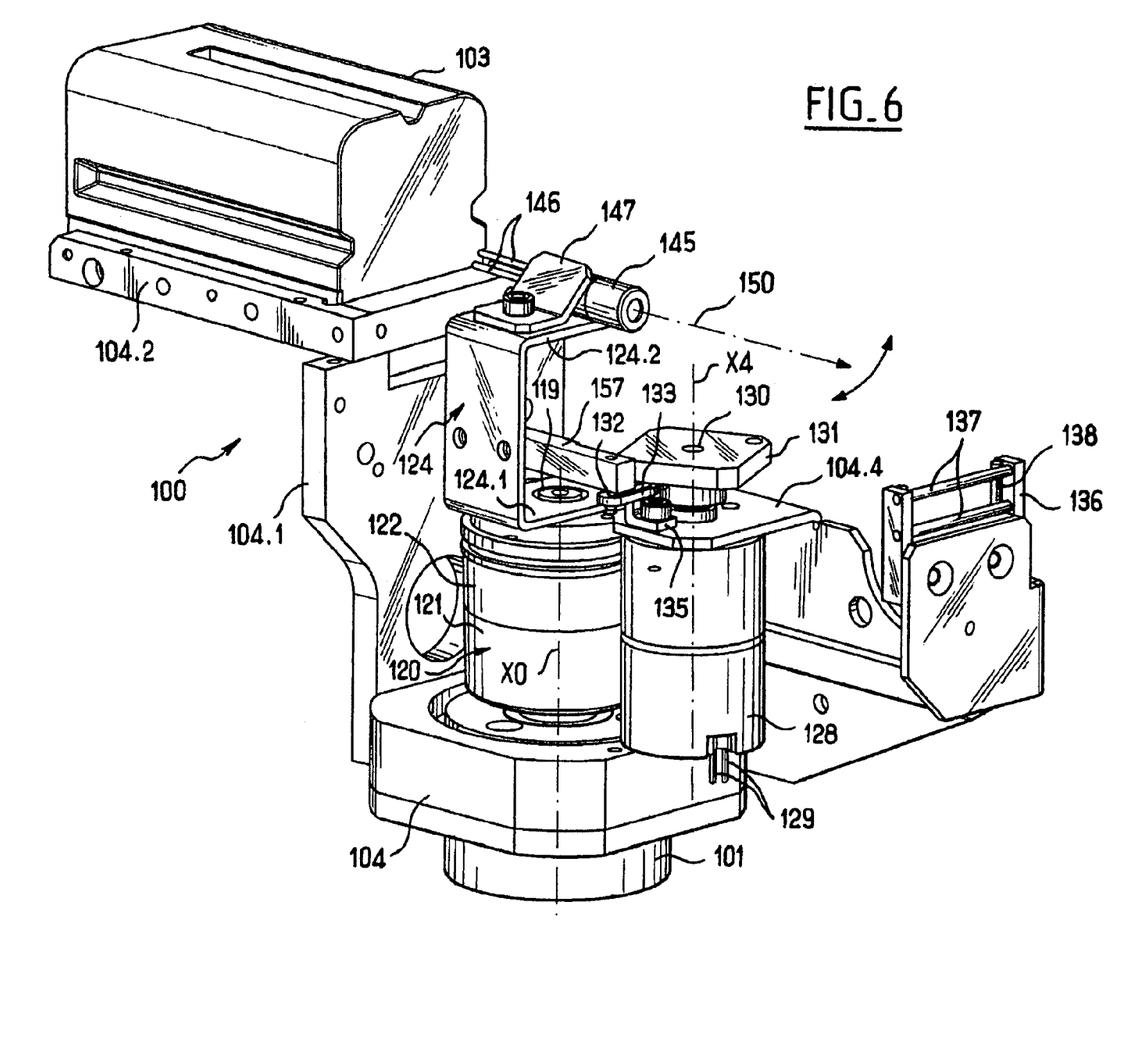
FIG. 6 is another perspective view restricted to the members associated with the action of a laser emitter for measuring angles.

In FIG. 3, it can be seen that the entire device above the stationary stand 101 is housed in a cover forming a housing 102 that protects all of its components against dust and impacts. Specifically, since the device is entirely self-sufficient in terms of energy, a battery 103 is included on the housing 102 so as to avoid the pointless presence of connection wires. The turret 104 is mounted to turn on the stationary stand 101 via a ball bearing 117 which is visible in the section of FIG. 7. The assembly is held by a plate 118 screwed onto the stationary stand 101.

The turret 104 presents an essentially vertical plate 104.1 having mounted thereon a housing 106 containing a measuring tape reel 105 from which the tape 107 can be pulled in an essentially horizontal direction D so as to bring its free end up to one of the reference points of the above-mentioned pointer 10.

In this example the measuring tape 107 presents a plurality of uniformly spaced-apart windows 108, e.g. of rectangular shape and obtained by being punched directly in the tape. The distance between the centers of the windows is accurately guaranteed and there is no accumulation of position error.

The tape 107 passes through a detector force 140 disposed directly at the outlet from the housing 106 containing the reel 105. As can be seen more clearly in FIG. 5, a bracket 116 is mounted on the plate 104.1 and supports the above-mentioned fork 140 which is constituted both by an emitter 141 having power supply wires referenced 143, and by a receiver 142 having power supply wires referenced 144. The passage of the uniformly spaced windows 108 in the tape 107 can then be read by the detector fork 140, which can thus count the number of windows 108 that have gone through since the tape 107 started to be pulled out. For example, pairs of adjacent windows 108 may be spaced apart at an interval of 25 millimeters (mm).

Nevertheless, it is appropriate to add to the above-described means firstly in order to refine measurement along the segment between the last two windows 108 in question, and also to determine the direction in which the tape is traveling since the tape can either be pulled out in the direction D or on the contrary can travel in the opposite direction back onto the reel.

This is achieved by using a encoder 125 in the form of a wheel 126 mounted to turn about the central axis X3 of the encoder, which axis is horizontal. A bar 139 secured to the turret 104 is fitted with a presser wheel 127 overlying the encoder wheel 126 leaving a gap that is just wide enough to allow the tape 107 to pass between them. The encoder wheel 126 is preferably rubber-coated on its periphery in order to prevent any unwanted slip that would falsify measurement.

The encoder 125 can then measure the distance beyond the last window 108 to have passed through the detector fork 140, and can also be used to assess the travel direction of the tape 107.

The tape 107 can thus be pulled in the direction D, passing through a guide plate 136 fitted with horizontal spindle rollers 137 and vertical spindle rollers 138 defining a rectangular through window. The tape 107 also passes through a window 111 formed in a bracket 140.3 forming part of the turret 104.

The above-mentioned members thus enable the lengths of the segments joining the origin points set on the vertical central axis X0 to each of the two calibrated reference points 11 and 12 of the pointer 10. The above-mentioned first electronic means, essentially constituted by the encoder 125 and the detector fork 140, make it easy to obtain measurement accuracy of the order of one-tenth of a millimeter.

The device 100 also has a laser emitter 145 that is mounted on an encoder 120, itself mounted on the stationary stand 101 so as to turn about the same vertical axis X0 as the turret 104, and being arranged in such a manner that the beam 150 emitted by said laser emitter is essentially horizontal.

Specifically, a stationary shaft 119 is provided that is rigidly secured to the stationary stand 101, being set on the central axis X0, which stationary shaft has arranged thereon an encoder 120 with a bottom portion 121 that is secured to the stationary shaft 119, and a top portion 122 that is movably mounted to turn about said central axis 119 via ball bearings 123. A bracket 124 is placed on the moving portion 122 of the encoder 120 via a bottom branch 124.1, and has a top branch 124.2 carrying the laser emitter 145 which is held in position by a tab 147. The laser emitter 145 is powered by an associated cable 146 which is connected to control means of the device, preferably via wireless communication means, as described below.

As mentioned above, the laser beam 150 is directed towards the target 200 once it is in position on one of the reference points 11 or 12 of the pointer 10 so as to strike a diode that is arranged in said target behind a narrow vertical slit. Although it might be satisfactory to make use of the signal that is given at the instant when the laser beam 150 strikes the corresponding diode, even better accuracy can be obtained by taking a plurality of measurements, and for this purpose it is advantageous to be able to cause the laser emitter 145 to oscillate in a horizontal plane, pivoting about the vertical central axis X0 on either side of the direction to the above-mentioned vertical slit carried by the target 200.

The moving equipment constituted by the top portion 122 of the encoder 120, the support bracket 124, and the laser emitter 145 can be pivoted about the central vertical axis X0. In order to cause this moving equipment to oscillate about the central axis X0, a motor and gearbox unit 128 is provided that is secured to a plate 140.4 forming part of the turret 104 in such a manner that its central axis X4 is vertical. The power supply cable to the motor and gearbox unit 128 is referenced 129 and the unit is controlled electrically. The output shaft from the unit 128 is referenced 130, and this shaft carries a cam 131 which is shown as being in the form of a substantially square cam wheel. Furthermore, a bar 157 is secured to the middle branch of the U-shaped bracket 124, which bar 157 extends in a horizontal direction having a free end that is kept in contact with the cam 131 by a resilient belt 133 passing over a finger 132 on said bar and over a bracket 135 secured to the fastening plate 104.4.

As can easily be understood, when the motor unit 128 is activated, rotation of the cam 131 causes the bracket 124 to oscillate and consequently causes the laser 145 it carries to oscillate on either side of a middle position.

In practice, it is advantageous to make provision for one or two go-and-return cycles, constituting a process of taking four measurements in succession, with the measurement that is finally taken into account then being the arithmetic mean of the four measurements taken. This implements a particular characteristic of the invention whereby the laser emitter 145 is caused to oscillate in a horizontal plane in order to strike the target 200 several times, with the angle of measurement finally taken into account being the arithmetic mean of the measurements taken while the laser emitter is oscillating.

There can also be seen a display member 115 at the top of the bracket 140.3 serving in particular to display the coordinates as measured of the reference points.

Specifically, remote control means are provided so as to minimize as much as possible the presence of cumbersome wires. Thus, in FIG. 7, there can be seen an infrared receiver diode 114 which is struck by a beam 250 passing through a window 113 formed in the bracket 104.3, which beam 250 is emitted from the target 200, as described below. The above-mentioned window 113 directly overlies a window 112 through which the laser beam 150 emitted by the laser emitter 145 passes.

Figure 8:
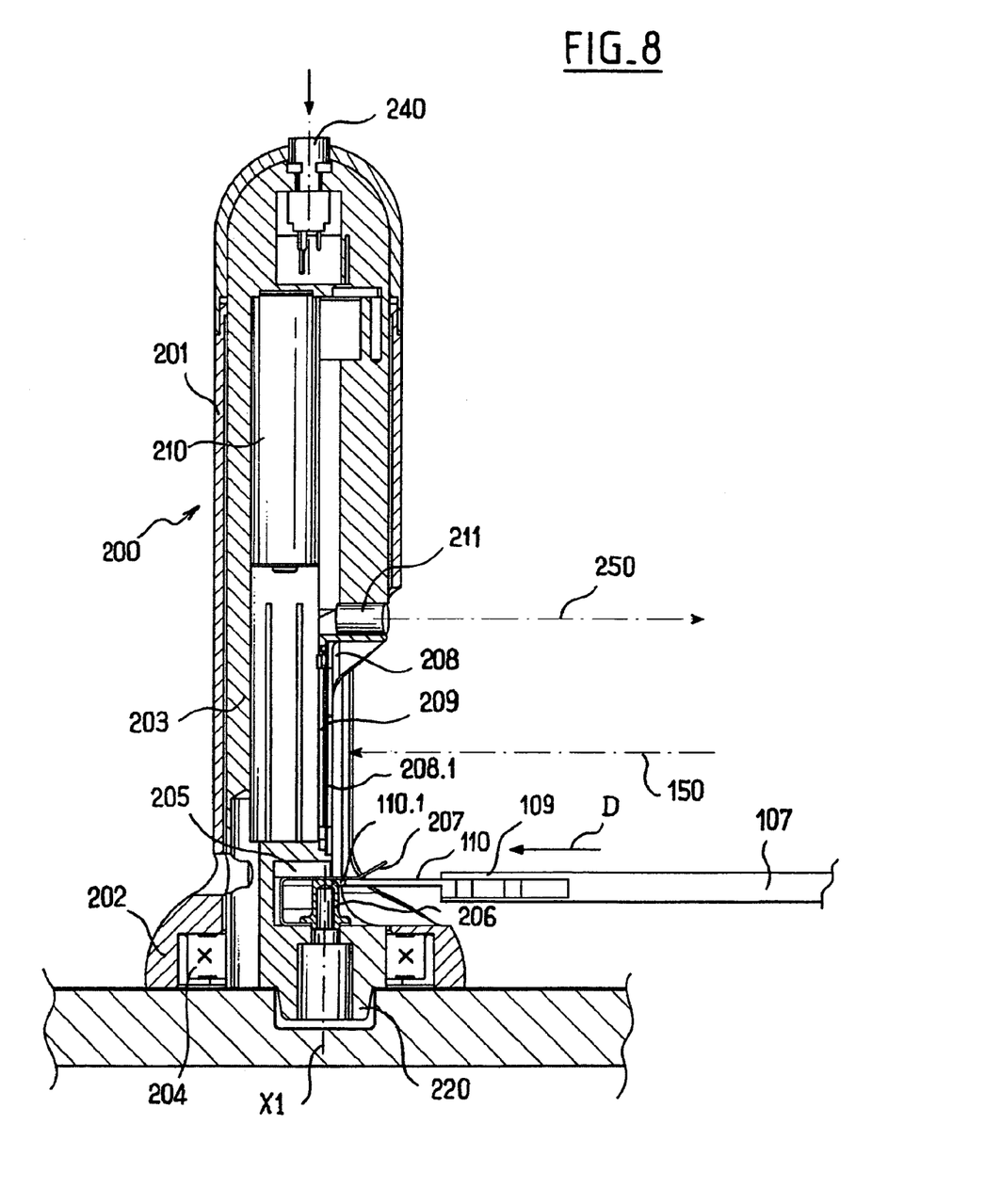
FIG. 8 is a section view showing the particular structure of a target to which the end of the measuring tape is hooked, and which includes the electronic members associated with measuring angles.

FIG. 8 shows more clearly the particular structure of the target 200 that is aimed at by the beam emitted by the laser emitter 145.

The target 200 thus comprises an outer case 201 of essentially cylindrical shape that can be manipulated like the handle of a piece of equipment. The target 200 is thus organized in the form of an independent handle presenting a bottom collar 202 for pressing against the pointer 10. In FIG. 8, there can be seen an engagement stud 220, whereby the handle 201 is engaged on one or the other of the reference points 11 and 12 of the pointer 10. To prevent any interfering forces acting while the handle is being moved, the stud is mounted via a ball bearing 204. The central body 203 that is housed inside the handle-forming case 201 presents an internal housing 205 for receiving the free end 109 of the measuring tape 107, and more particularly for hooking onto a plate 110 rigidly secured to said end 109. An axial peg 206 is provided that is engaged in a hole 110.1 of the plate 110, thereby hooking onto the free end of the tape 107. To avoid any untimely release of the free end, a spring blade 207 is also provided that keeps it in position on the axial peg 206. If it is subsequently desired to separate the free end of the tape 107, it suffices to lift the raised external portion of the spring blade 207 slightly in order to separate the plate 110 from the axial peg 206. The axial peg 206 is set on a vertical axis X1 which is accurately in alignment with the central axis of the blind hole associated with the reference point 11 or 12, because the engagement stud 220 is of frustoconical shape. It is thus the distance between the vertical axes X0 and X1 that is accurately measured by the above-mentioned electronic means.

To measure angles, a slit plate 208 is provided that has a narrow vertical slit 208.1 of width of the order of a few tenths of a millimeter. Behind the slit 208.1, there is arranged a receiver diode 209 that is set on the above-mentioned axis X1. Each time the laser beam 150 strikes the diode 209 by passing through the slit 208.1, a signal is emitted to trigger measurement of the corresponding angle.

Specifically, the handle is independent, i.e. it contains its own electrical power supply battery referenced 210. Furthermore, the handle carries a top control button 240 that is positioned so as to be easily pressed by the operator's thumb. Above the window 208 presenting the slit 208.1, there is also provided an infrared emitter 211 arranged to emit a horizontal beam 250 that strikes the above-mentioned receiver diode 114. The infrared emitter 211 thus points towards the means for causing the laser emitter 145 to oscillate.

By pressing on the pushbutton 240, the operator triggers infrared emission from the emitter 211, and consequently triggers both the recording of the measurements corresponding to the reference point in question, and also activation of the motor unit for causing the laser emitter 145 to oscillate in a horizontal plane so as to obtain the desired angle measurement as well. When the laser beam 150 emitted by the emitter 145 activates the diode 209 carried by the target 200, the infrared emitter 211 sends a signal for making the corresponding recording, thus making it possible to obtain not only a measurement that is very accurate, but also to determine the direction of rotation with a pip of a few milliseconds.

Figure 9:
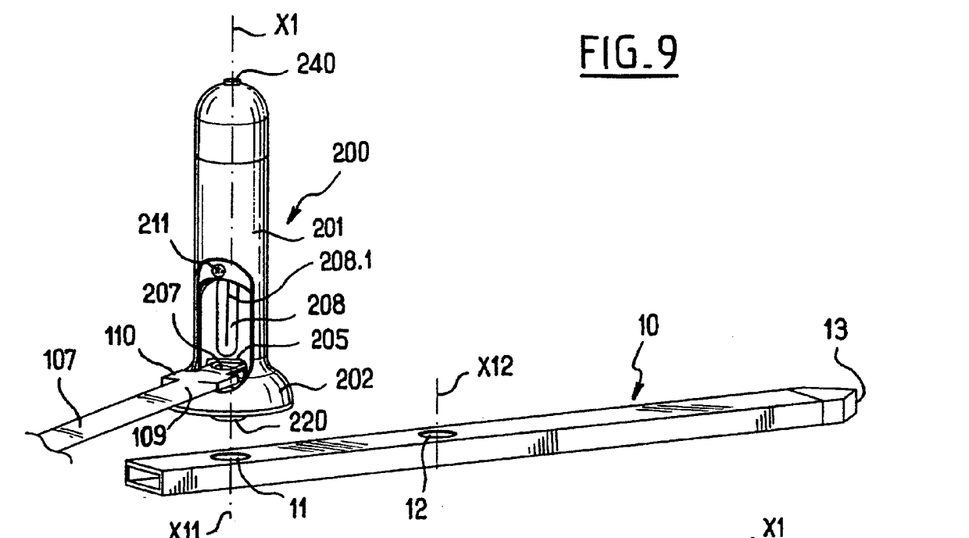
FIG. 9 is a fragmentary view showing how the handle that forms the target for pulling the measuring tape is handled in order to come up to a reference point of the pointer.
Figure 10:
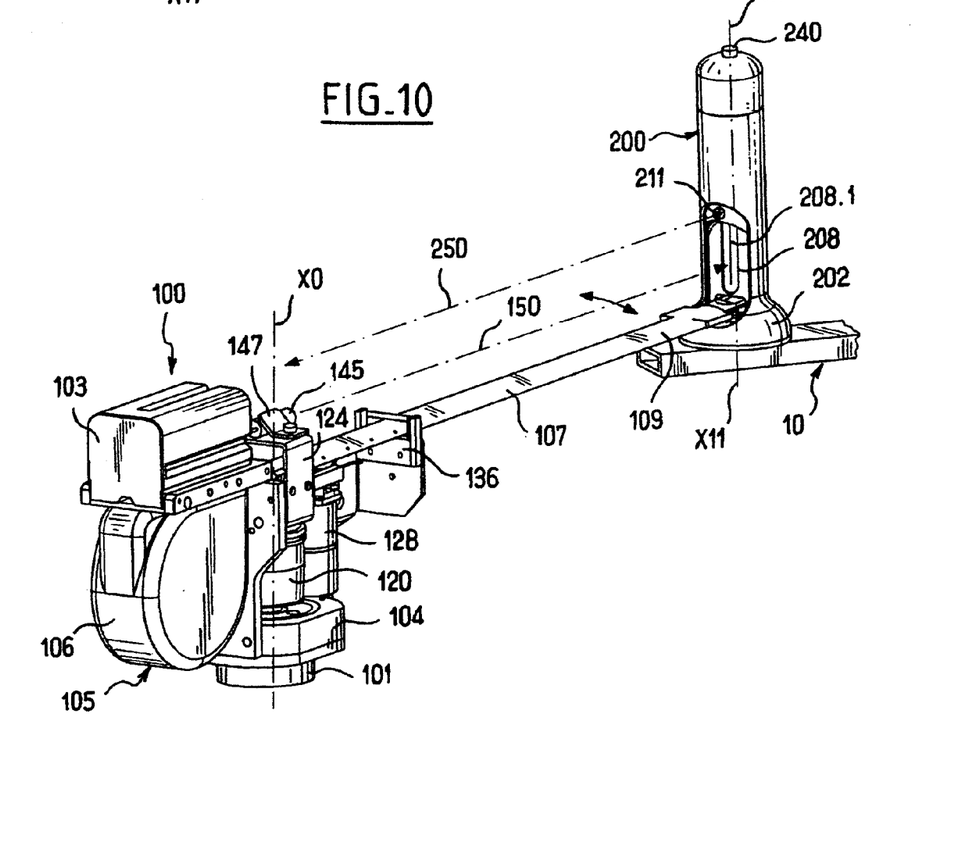
FIG. 10 is a perspective view of the handle-forming target positioned on one of the reference points of the pointer, and the oscillating movement of the laser emitter in a horizontal plane in association with making accurate measurements of angular movements.

FIGS. 9 and 10 show the target 200 being put into position, pulling the hooked end of the measuring tape until the target handle has its engagement stud 220 engaged in one of the calibrated points 11 and 12 of the pointer 10. When the target 200 is engaged on one of the reference points 11 or 12, the axis X1 of the target coincides with the axis X11 or X12 of the reference point 11 or 12 in question.

The target handle 200 can be manipulated quickly and easily, and because the member 206 for hooking the free end of the tape 107 can turn about the axis X1, no disturbing force interferes with the pulled tape being rectilinear in shape. It is thus guaranteed that the measurements taken are completely reliable both in terms of length and in terms of angular displacement as recorded by the above-mentioned electronic means.

Once measurements have been taken at both reference points 11 and 12, it suffices for the operator to change the position of the pointer 10 by bringing its end 13 up to another point to be identified, and take new measurements in the same manner.

The electronic means associated with calculating and storing the measured data are preferably grouped together in a separate unit. FIG. 3 shows a portable computer 300 constituting such a separate unit, with an antenna 301 that provides a connection with the electronic means 125, 140 associated with measuring the length of the pulled-out tape, and with the means 120, 145, 200 associated with measuring the angular displacement of the turret 104 about its axis X0, and this is achieved by a wireless communications system. The screen 302 on the microcomputer 300 also enables the operator to see the profile L as reconstituted in this way from the various measurements that are taken.

A technique is thus provided for determining a horizontal profile line that is both simple and inexpensive to implement, while being capable of accommodating any type of geometrical irregularity resulting from the specific arrangement of the essentially vertical walls in question.

The data set constituted by the coordinates of the points as determined in this way constituting the horizontal profile line L, i.e. coordinates in the horizontal plane H in which all of the points of said horizontal profile line are situated, constitutes a data set capable of being transmitted subsequently to a numerically-controlled machine tool which will then physically machine a solid board so that its outline corresponds exactly to the horizontal profile line as determined in this way.

The invention is not restricted to the embodiments described above, but on the contrary covers any variant using equivalent means to reproduce the essential characteristics set out above.

For example, in a variant, the above-described device could be used with a different sensor that is U-shaped, having two contact points (the two free ends) and only one calibrated reference point, thus enabling the points of a wall whose profile remains generally close to a rectilinear direction to be measured more quickly. The rectilinear direction in the horizontal plane is then determined by being measured at two spaced-apart points, with the intermediate points between the spaced-apart points being determined by digitizing. Nevertheless, that technique for determining the profile is a little less accurate than when using two calibrated reference points as described above.

While the present invention has been illustrated and described with respect to a particular embodiment thereof, it should be appreciated by those of ordinary skill in the art that various modifications to this invention may be made without departing from the spirit and scope of the present invention.

The invention claimed is:

1. A method of determining a horizontal profile line defined by walls that are essentially vertical, by using a pointer having two calibrated reference points, the method comprising the following successive steps:
    a) placing the pointer horizontally in contact with a point of the profile line to be determined;
    b) from a stationary origin point situated substantially in the same horizontal plane as the contact point and the two calibrated reference points of the pointer, successively measuring the length of the segments joining the origin point to each of the reference points, and also measuring the angle between said two segments;
    c) deducing by calculation the coordinates of the contact point in said horizontal plane, and storing said coordinates; and
    reiterating steps a), b), c) for a plurality of points on the profile line to be determined, including in said plurality of points at least the angle points situated at the intersections between said essentially vertical walls.

2. The method according to claim 1, wherein the length measurements performed in step b) are taken by using a measuring tape pulled from the origin point successively to each of the two reference points of the pointer.

3. The method according to claim 2, wherein the length measurements are taken by electronic means including a detector fork through which the measuring tape passes, and an encoder which co-operates with said tape.

4. The method according to claim 1, wherein the angle measurements performed in step b) are taken using a laser emitter arranged at the origin point and a target engaged on the reference point in question.

5. The method according to claim 4, wherein the laser emitter is caused to oscillate in a horizontal plane to strike the target several times, with the angle measurement that is retained being the arithmetic mean of the measurements taken during the oscillation of said laser emitter.

6. The method according to claim 4, wherein the target also serves as control means for triggering the taking of measurements.

7. An apparatus for implementing the method of determining a horizontal profile line according to claim 1, the apparatus comprising:
    a stationary stand;
    a turret mounted on the stationary stand to turn about a vertical central axis;
    a housing secured to the turret and containing a reel of the measuring tape in such a manner that the tape can be pulled from the reel in an essentially horizontal direction so as to bring its free end up to a reference point of a pointer;
    first electronic means also mounted on the turret and arranged to measure accurately the length of tape that has been pulled out;
    second electronic means arranged to measure the angular displacement of the turret about its axis relative to a reference point of the pointer; and
    third electronic means arranged to receive the successive measurements of lengths and angular displacement performed by the first and second electronic means, and to calculate the coordinates of a contact point of the pointer, and to store said coordinates in order to determine the corresponding horizontal profile line.

8. The apparatus according to claim 7, wherein the first electronic means comprise a detector fork through which the tape passes from the reel, arid an encoder having a moving portion over which said tape passed.

9. The apparatus according to claim 8, wherein the measuring tape presents windows that are uniformly spaced apart, with the passage of the windows being read by the detector fork, the encoder enabling the distance beyond the last window that has passed through said detector fork to be measured, and also serving to measure the travel direction of said tape.

10. The apparatus according to claim 7, wherein the second electronic means comprise a laser emitter secured to an encoder mounted on the stationary stand to turn about the same vertical axis as the turret, being arranged in such a manner that the beam emitted by said laser emitter is substantially horizontal, and a target for being aimed at by the beam emitted by the laser emitter, said target also being arranged to serve firstly for hooking onto the free end of the measuring tape, and secondly for being engaged on a reference point of the pointer in such a manner that said free end is close to being vertically above the center of said reference point.

11. The apparatus according to claim 10, including means for causing the laser emitter to oscillate in a horizontal plane, pivoting about the vertical central axis on either side of the direction to a vertical slit carried by the target.

12. The apparatus according to claim 11, wherein the means for causing the laser emitter to oscillate comprise a motor and gearbox unit secured to the turret, having a vertical outlet shaft carrying a cam co-operating with a bracket whereby the laser emitter is mounted on the encoder.

13. The apparatus according to claim 11, wherein the target includes a remote control member for triggering oscillation of the laser emitter and measurement of distance by the first electronic means, while the target is being held in the hand of the operator.

14. The apparatus according to claim 13, wherein the target is arranged in the form of a generally cylindrical handle, said handle being independently powered, with a receiver diode behind the vertical slit at which the laser beam is aimed, and an infrared emitter pointing towards the means for causing the laser emitter to oscillate, together with a control member arranged in the form of a pushbutton located at the top of the handle and a member for hooking onto the free end of the measuring tape, which member is arranged at the bottom portion of said handle.

15. The apparatus according to claim 14, wherein the member for hooking the free end of the measuring tape is mounted to turn about an axis that lies vertically over the center of the reference point of the pointer when the handle is engaged via an engagement stud on said reference point.

16. The apparatus according to claim 7, wherein the turret carries on top a display member serving in particular to display the coordinates of the measured reference points.

17. The apparatus according to claim 7, wherein the third electronic means associated with calculation and storage are grouped together in a separate unit connected to the first and second electronic means by a wireless communications system.

* * * * *

UNITED STATES PATENT AND TRADEMARK OFFICE
CERTIFICATE OF CORRECTION

PATENT NO.         : 7,298,467 B2　　　　　　　　　　　　　　　　　　　　　　　　Page 1 of 1
APPLICATION NO. : 11/256470
DATED              : November 20, 2007
INVENTOR(S)        : Romain Granger It is certified that error appears in the above-identified patent and that said Letters Patent is hereby corrected as shown below:

Column 12, claim 8, line 3 please delete the word "arid" and replace with the word --and--.

Signed and Sealed this

Fifteenth Day of April, 2008

JON W. DUDAS
*Director of the United States Patent and Trademark Office*

UNITED STATES PATENT AND TRADEMARK OFFICE
CERTIFICATE OF CORRECTION

| | |
|---|---|
| PATENT NO. | : 7,298,467 B2 |
| APPLICATION NO. | : 11/256470 |
| DATED | : November 20, 2007 |
| INVENTOR(S) | : Romain Granger |

It is certified that error appears in the above-identified patent and that said Letters Patent is hereby corrected as shown below:

Column 12, claim 8, line 7 please delete the word "arid" and replace with the word --and--.

Signed and Sealed this

Twenty-ninth Day of April, 2008

JON W. DUDAS
*Director of the United States Patent and Trademark Office*